(12) United States Patent
Engel et al.

(10) Patent No.: US 6,278,594 B1
(45) Date of Patent: Aug. 21, 2001

(54) DUAL ELEMENT MAGNETORESISTIVE READ HEAD WITH INTEGRAL ELEMENT STABILIZATION

(75) Inventors: Bradley N. Engel; Richard H. Dee, both of Louisville; Robert B. Chesnutt, Arvada, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/170,330

(22) Filed: Oct. 13, 1998

(51) Int. Cl.$^7$ ........................................................ G11B 5/39
(52) U.S. Cl. ................................................................ 360/325
(58) Field of Search ......................... 360/110, 113, 360/314, 315, 316, 324, 325, 327.1, 327.2, 327.22, 327.23, 327.3, 327.31

(56) References Cited

U.S. PATENT DOCUMENTS

| | | |
|---|---|---|
| 3,860,965 | 1/1975 | Voegeli . |
| 4,476,454 * | 10/1984 | Aboaf et al. .................. 338/32 R |
| 4,663,685 | 5/1987 | Tsang . |
| 4,771,349 | 9/1988 | Tsang . |
| 4,785,366 | 11/1988 | Krounbi et al. . |
| 4,949,039 * | 8/1990 | Grunberg ......................... 324/252 |
| 5,014,147 * | 5/1991 | Parkin et al. .................... 360/113 |
| 5,018,037 | 5/1991 | Krounbi et al. . |
| 5,309,305 | 5/1994 | Nepela et al. . |
| 5,508,866 | 4/1996 | Gill et al. . |
| 5,569,544 * | 10/1996 | Daughton ......................... 428/611 |
| 5,576,915 * | 11/1996 | Akiyama et al. ................. 360/113 |
| 5,612,098 * | 3/1997 | Tan et al. ......................... 427/529 |
| 5,668,685 * | 9/1997 | Soeya et al. ...................... 360/113 |
| 5,684,658 | 11/1997 | Shi et al. . |
| 5,696,654 | 12/1997 | Gill et al. . |
| 5,701,223 | 12/1997 | Fontana, Jr. et al. . |
| 5,706,151 * | 1/1998 | Smith ................................ 360/113 |
| 5,792,547 * | 8/1998 | Liu et al. .......................... 428/212 |
| 5,859,754 * | 1/1999 | Tong et al. ....................... 360/113 |
| 6,028,750 * | 2/2000 | Ohtsubo ........................... 360/126 |
| 6,075,679 * | 6/2000 | Saito et al. ....................... 360/113 |

* cited by examiner

Primary Examiner—William Klimowicz
Assistant Examiner—Tianjie Chen
(74) Attorney, Agent, or Firm—Brooks & Kushman P.C.

(57) ABSTRACT

A dual active element magnetoresistive tape read head uses weak biasing of active layers to reduce Barkhausen noise. The read head includes a first insulator layer. A first active magnetoresistive layer is built on the first insulator layer. A second insulator layer is built on the first active magnetoresistive layer. A second active magnetoresistive layer is on the second insulator layer. The second active magnetoresistive layer is magnetostatically coupled to the first active magnetoresistive layer. A third insulator layer is on the second active magnetoresistive layer. At least one insulator layer is a biasing layer comprised of an electrically nonconductive antiferromagnetic material.

24 Claims, 6 Drawing Sheets

DUAL ELEMENT MAGNETORESISTIVE READ HEAD WITH INTEGRAL ELEMENT STABILIZATION

TECHNICAL FIELD

The present invention relates to stabilizing active layers in dual element magnetoresistive read heads.

BACKGROUND ART

Information is written onto a magnetic tape by magnetizing tape elements. These magnetized tape elements produce a magnetic field which can be detected and converted to an electrical signal by a read head. A common type of read head for carrying out this conversion is the magnetoresistive (MR) read head.

A simple MR head consists of a thin film of magnetoresistive material, such as Permalloy, between two insulating layers. When the MR layer is formed, a magnetic field is typically applied in a direction parallel to the plane of the thin layer. Thus, the MR layer exhibits a uniaxial anisotropy with an easy-axis of magnetization parallel to the direction of the applied field. If an external magnetic field, such as from a magnetic tape, is applied normal to the easy-axis, the magnetization direction of the MR layer will rotate away from the easy-axis and towards the direction of the applied magnetic field. This magnetization rotation causes a change in resistance in the MR layer. When no external field is applied, the resistance is greatest. The resistance decreases with increasing applied field. For practical geometries of the MR layer, resistance as a function of applied field traces a bell-shaped curve. The MR head is often biased with an applied current such that a zero magnitude applied field results in a resistance near an inflection point on the resistance curve. Thus, small changes about a zero magnitude applied external field result in nearly linear changes in resistance.

To accommodate increasing densities of data stored on magnetic tape, the geometries of read heads continue to shrink. One difficulty encountered is the increasing affect of Barkhausen noise. As the width of the MR layer is narrowed, the MR layer tends to split into magnetic domains, resulting in demagnetization. In the presence of an increasing externally applied field, the domain walls make sudden movements, causing jumps in the output signal. Two methods exist to reduce or eliminate Barkhausen noise. The first is to increase the effective length of the MR layer. Lengthening the MR reduces demagnetization at the ends and, hence, results in a greater retention of a single magnetic domain. The main difficulty with this technique is that the resulting increase in read head size is contrary to the need for increased data density on magnetic tapes. The second technique uses a small magnetic field in the direction of the easy-axis to induce a single domain in the MR layer. An implementation of this method uses permanent magnetics placed over the ends of the MR layer. These magnets strongly pin the domains of the MR layer under the magnets and create a weak longitudinal magnetic field in the MR layer between the covered ends. Difficulties with this implementation include complex geometries and additional processing steps required to implement the additional permanent magnetic.

In addition to Barkhausen noise, cross-sensitivities to other parameters, such as temperature, can affect the performance of the MR head. A dual active element MR read head minimizes cross-sensitivities. The dual active element MR head includes two MR layers in parallel separated by an insulating layer. Two additional insulating layers, one on each end of the structure, insulate the MR layers from surrounding materials. The two MR layers are connected in parallel to a source current such that current flows in the same direction through both layers. The fringe field produced by current flowing through each MR layer biases the adjacent layer. Hence, an externally applied magnetic field produces an increase in resistance of one MR layer and a corresponding decrease in resistance of the other MR layer. A differential amplifier with an input connected to each MR layer converts these changes in resistance to an output voltage. Environmental changes to both MR layers, such as changes in temperature, appear as common mode inputs to the differential amplifier and, hence, are rejected.

What is needed is a dual active element MR read head with reduced Barkhausen noise susceptibility. The read head should be easy to produce, have simple geometry, and not require additional processing steps over prior dual active element MR read heads.

DISCLOSURE OF THE INVENTION

It is an object of the present invention to provide a dual active element magnetoresistive read head with reduced Barkhausen noise.

Another object of the present invention is to provide a read head with reduced Barkhausen noise that is easy to produce.

Still another object of the present invention is to provide a read head with reduced Barkhausen noise and with a simple geometry.

Yet another object of the present invention is to provide a dual active element magnetoresistive read head with reduced Barkhausen noise that does not require additional production steps over prior read heads.

In carrying out the above objects and other objects and features of the present invention, a dual active element magnetoresistive read head for magnetic tapes is provided. The MR read head includes a first insulator layer. A first active magnetoresistive layer is on the first layer. A second insulator layer is on the first active magnetoresistive layer. A second active magnetoresistive layer is on the second insulator layer. The second active magnetoresistive layer is magnetostatically coupled to the first active magnetoresistive layer. A third insulator layer is on the second active magnetoresistive layer. At least one insulator layer is a biasing layer comprised of an electrically nonconductive antiferromagnetic material.

In an embodiment of the present invention, the electrically non-conductive antiferromagnetic magnetic material is nickel oxide.

In another set of embodiments according to the present invention, the at least one biasing layer is one of either the second insulator layer, the first insulator layer and the third insulator layer, the second insulator layer and the third insulator layer, or the first insulator layer and the second insulator layer.

In still another embodiment of the present invention, each active magnetoresistive layer is adjacent to at least one biasing layer. Each active magnetoresistive layer further has a thickness allowing each adjacent biasing layer to establish a weak field across the thickness of the active magnetoresistive layer. The weak field produces magnetization that has the same direction throughout the active magnetoresistive layer in the absence of an externally applied field.

In yet another set of embodiments according to the present invention, the weak fields in the magnetoresistive layers are either parallel, antiparallel, or normal to each other.

In a further embodiment according to the present invention wherein two insulator layers on either side of a particular magnetoresistive layer are biasing layers, the read head includes a separation layer between one of the two biasing insulator layers and the particular magnetoresistive layer. The separation layer breaks the exchange bias from the one insulator layer to the particular magnetoresistive layer. In a refinement, the separation layer comprises at least one of titanium and tantalum.

A magnetoresistive read head assembly for sensing information recorded on a magnetic tape surface is also provided. The read head assembly includes a first insulator layer, a first active magnetoresistive layer on the first insulator layer, a second insulator layer on the first active magnetoresistive layer, a second active magnetoresistive layer on the second insulator layer, and a third insulator layer on the second active magnetoresistive layer. At least one insulator layer is comprised of an electrically non-conductive antiferromagnetic magnetic material. The read head also includes means for supplying current through the first active magnetoresistive layer and the second active magnetoresistive layer. The read head further includes means for detecting the relative change in resistance between the first active magnetoresistive layer and the second active magnetoresistive layer due to changing magnetic fields produced by the moving magnetic tape.

The above objects and other objects, features and advantages of the present invention are readily apparent from the following detailed description of the best modes for carrying out the invention when taken in connection with the accompanying drawings.

BEST MODES FOR CARRYING OUT THE INVENTION

Figure 1:
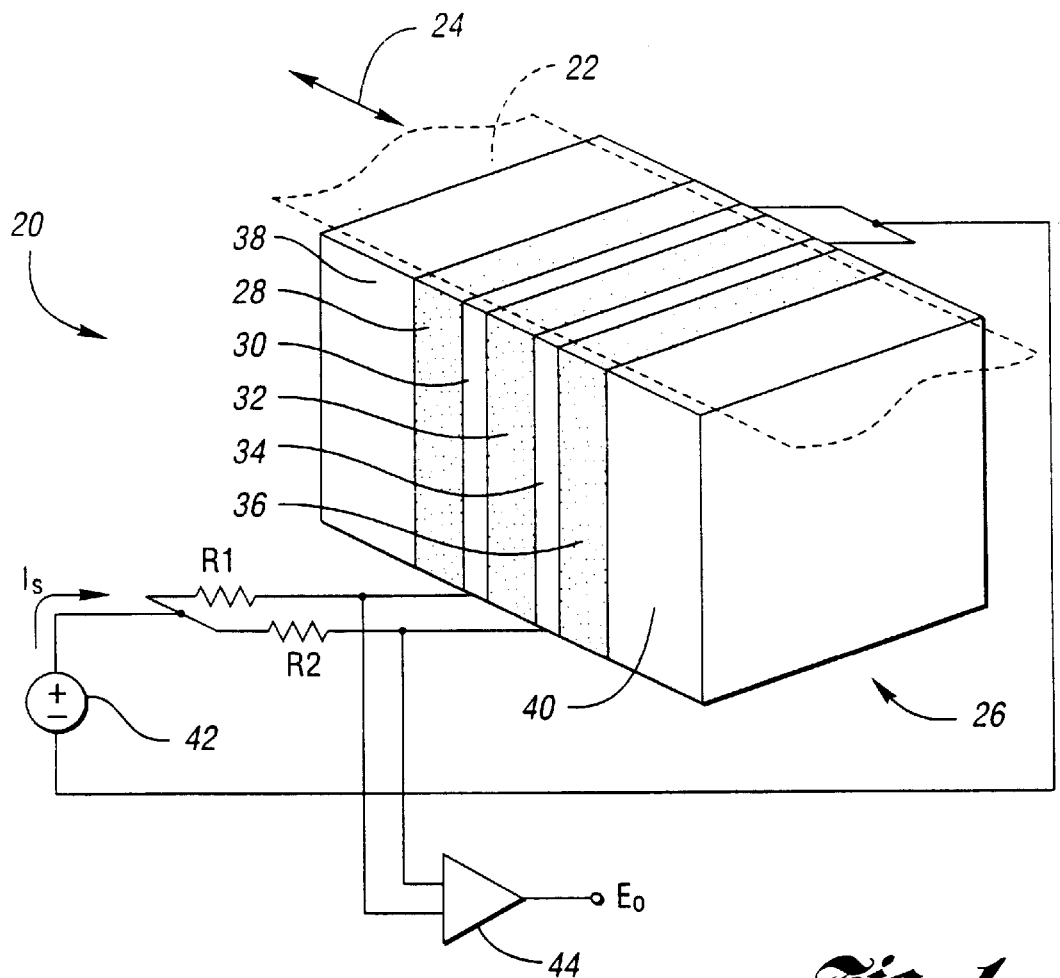
FIG. 1 is a schematic diagram of a dual active element magnetoresistive sensor.

Referring now to FIG. 1, a schematic diagram of a dual active element magnetoresistive read head is shown. A magnetoresistive (MR) read head, shown generally by 20, detects magnetic field patterns on tape 22 as tape 22 passes read head 20 in tape direction 24. Read head 20 includes a sensing element shown generally by 26. Sensing element 26 includes two active MR layers and three insulating layers. First insulator layer 28 insulates first active MR layer 30 from surrounding material. Second insulator layer 32 separates first active MR layer 30 and second active MR layer 34 and provides the magnetic gap spacing. Third insulator layer 36 insulates second active MR layer 34 from surrounding material.

In a preferred embodiment, first shield layer 38 is adjacent to first insulator layer 28 opposite from first MR layer 30. Also, second shield layer 40 is adjacent to third insulator layer 36 opposite from second MR layer 34. Shield layers 38,40 shield MR layers 30,34 from magnetic fields produced by magnetized regions of magnetic tape 22 not over MR layers 30,34. In addition to providing insulation, insulator layers 28,32,36 provide magnetic gap spacing between the two MR layers 30,34 and between each MR layer 30,34 and the nearest shielding layer 38,40.

Figure 2:
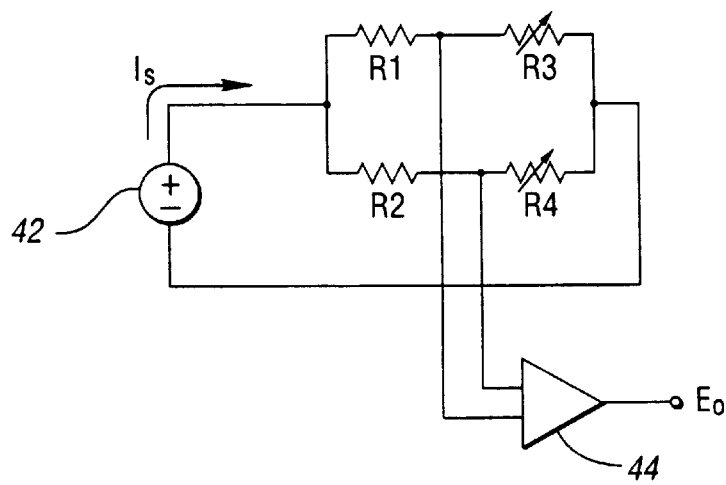
FIG. 2 is an equivalent circuit diagram for the dual active element magnetoresistive sensor of FIG. 1.

Referring now to FIG. 1 and to FIG. 2, in which an equivalent circuit diagram for the dual active element magnetoresistive read head of FIG. 1 is shown, the operation of the MR read head will be described. Independent voltage supply 42 provides a means for supplying current through first active MR layer 30 and second active MR layer 34. Other means for supplying current such as an independent current source, a dependent voltage source, or a dependent current source may be used as is known in the art. The supplied current, $I_S$, is split between two parallel paths. The first parallel path is through the series combination of resistor R1 and first active MR layer 30. The second path is through the series combination of resistor R2 and second active MR layer 34. Divided current $I_S$ flows through active MR layers 30,34 in a direction generally parallel to the surface of tape 22 and perpendicular to tape direction 24.

Active MR layers 30,34 change resistance in response to flux produced by magnetized fields on tape 22. First active MR layer 30 is represented by variable resistor R3 and second active MR layer 34 is represented by variable resistor R4 in FIG. 2. Differential amplifier 44, connected across the junction between resistors R1 and R3 and the junction between resistors R2 and R4, provides means for detecting the relative change in resistance between first active MR layer 30 and second active MR layer 34. The output of differential amplifier 44, $E_o$, indicates changes in magnetized fields on tape 22 as these changes move past first one and then the other of active MR layers, 30,34.

In previous dual active element MR read heads, insulator layers 28, 32,36 provided electrical insulation. In the present invention, at least one insulator layer 28,32,36 magnetically biases at least one active MR layer 30,34. This is accomplished by forming one or more insulator layer 28,32,36 from an electrically nonconductive antiferromagnetic material.

Figure 3:
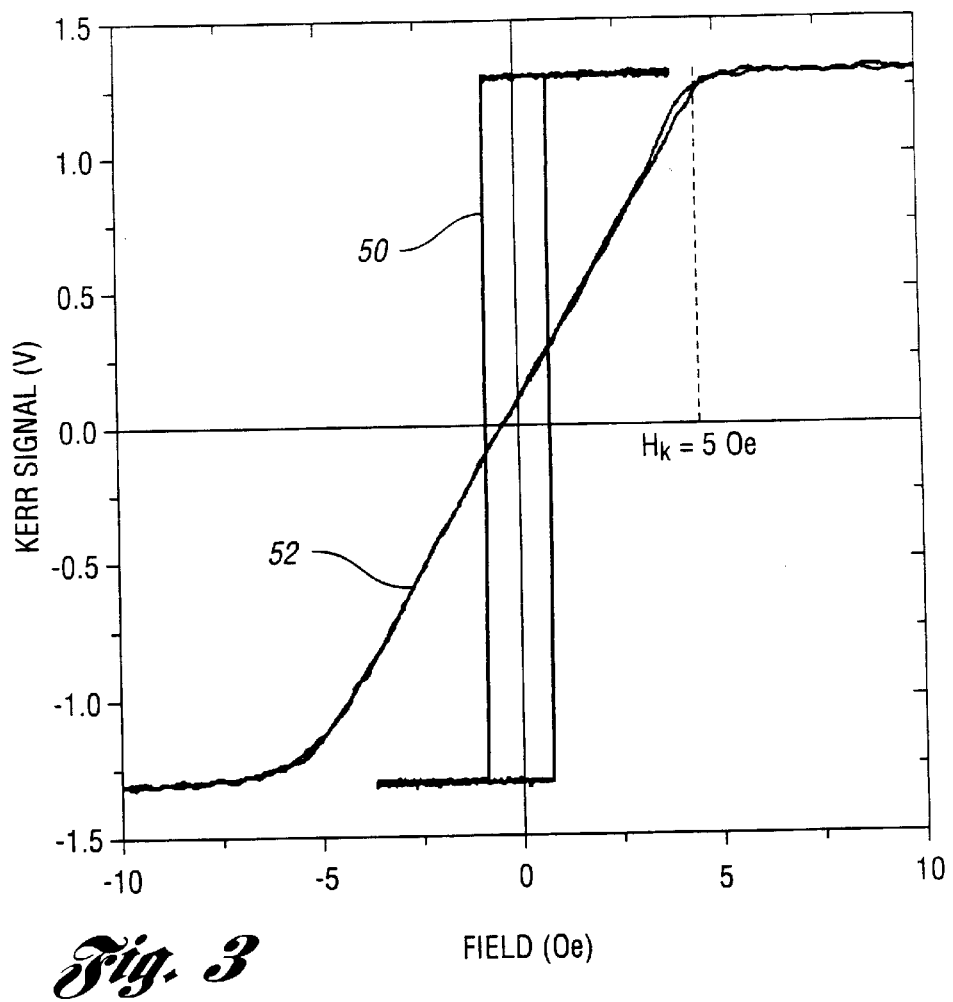
FIG. 3 is a graph showing M–H curves in easy-axis and hard-axis direction for a typical ferromagnetic layer.
Figure 4:
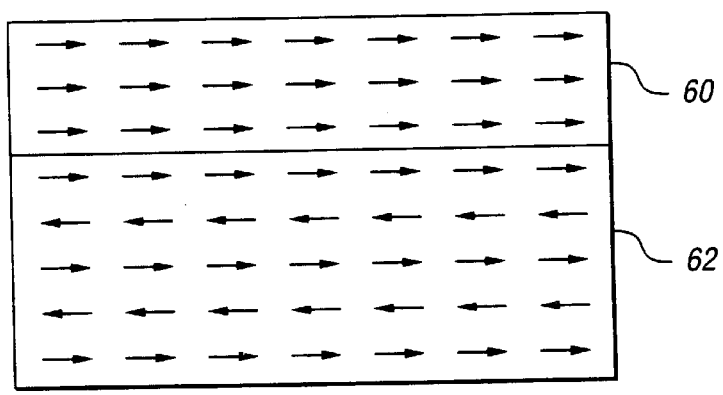
FIG. 4 is a conceptualized cross-sectional diagram showing the effect on a thin ferromagnetic layer of an adjoining antiferromagnetic layer.
Figure 5:
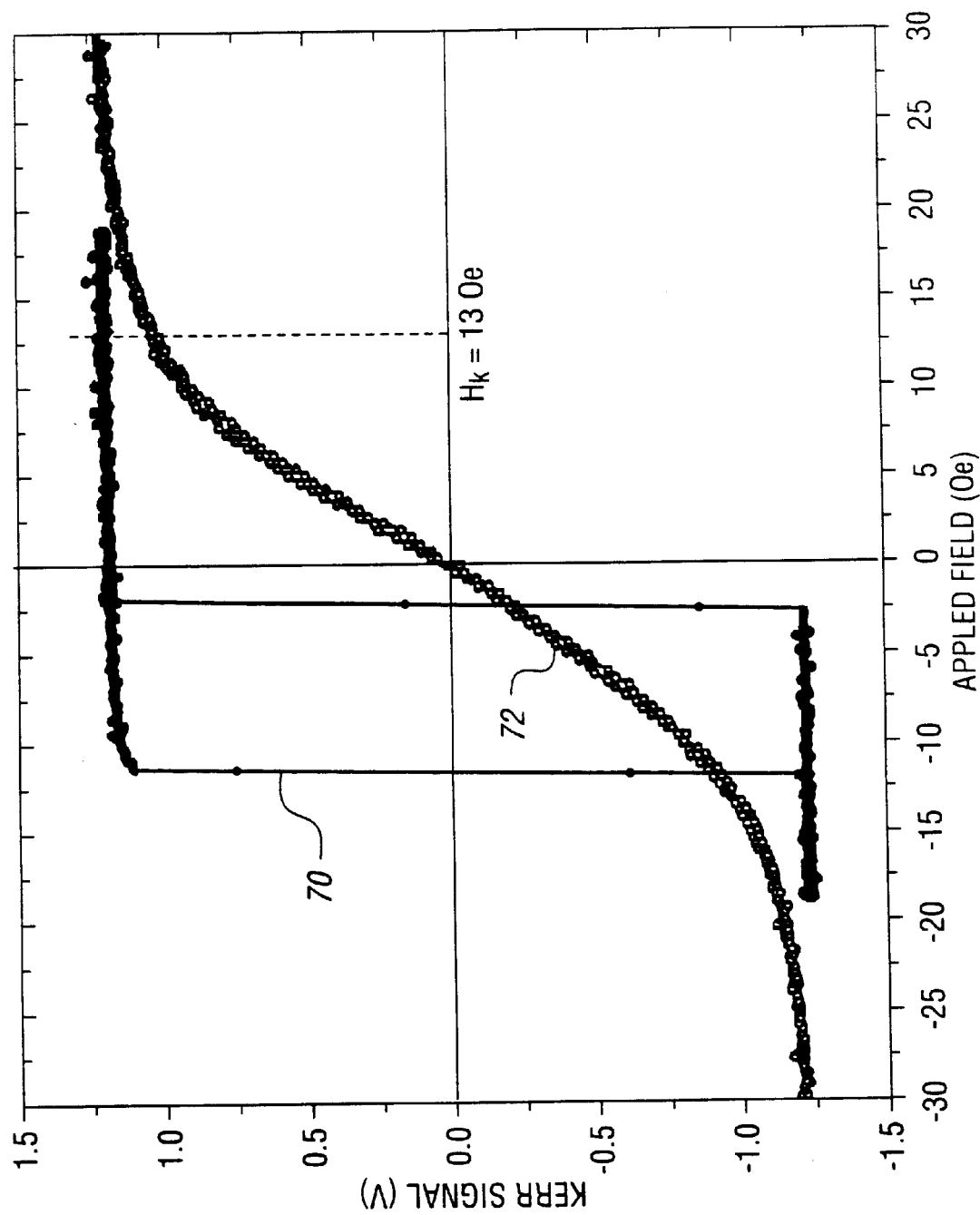
FIG. 5 is a graph showing M–H curves in easy-axis and hard-axis directions for a ferromagnetic layer adjacent to an antiferromagnetic layer.

Referring now to FIGS. 3 through 5, the use of an antiferromagnetic layer to bias a ferromagnetic MR layer will be described. FIG. 3 is a graph showing M–H curves in easy-axis and hard-axis directions for a typical ferromagnetic layer. The magnitude of magnetization is plotted as a function of applied magnetic fields in oersteds (Oe). The magnitude of magnetization is measured using a Magneto-Optic Kerr Element (MOKE) sensor. The resulting Kerr signal in volts is proportional to the magnitude of magnetization. Plot 50 is the M–H curve for magnetization along the easy-axis. Plot 52 is the M–H curve for magnetization along the hard-axis. Several items should be noted. First, there is very little hysteresis in hard-axis plot 52. This hysteresis is described by the coercivity of the material. A low coercivity is desired to prevent read head 20 from having memory.

A second item to note is the anisotropy field value, $H_k$, of 5 oersteds. The anisotropy field value indicates the strength of an applied field required to swing the magnetization direction from the easy-axis to the hard-axis. The greater the value for $H_k$, the stiffer or more resistant to applied fields is the material. For tape head 20, a generally lower value for the anisotropy field value is desired.

Referring now to FIG. 4, a conceptualized cross-sectional diagram showing the effect on a thin ferromagnetic layer of an adjoining antiferromagnetic layer is shown. Ferromagnetic layer 60 tends to have adjacent dipole moments line up in the same direction. Thus, ferromagnetic layer 60 exhibits a net macroscopic magnetic moment. Antiferromagnetic layer 62 tends to have the moments of adjacent atoms point in opposite direction. Thus, there is no net macroscopic moment in antiferromagnetic layer 62. It is known that if ferromagnetic layer 60 is in contact with antiferromagnetic layer 62, the moments of atoms in ferromagnetic layer 60 at the interface with antiferromagnetic layer 62 will be aligned with the moments of atoms at the corresponding interface of antiferromagnetic layer 62. This effect is known as exchange bias or exchange anisotropy. Under appropriate conditions, substantially all of the atomic moments in ferromagnetic layer 60 can be aligned in a desired direction due to adjacent antiferromagnetic layer 62.

Referring now to FIG. 5, a graph showing M–H curves in easy-axis and hard-axis directions for a ferromagnetic layer adjacent to an antiferromagnetic layer is shown. Curve 70 shows magnetization in the easy-axis direction. Curve 72 shows magnetization in the hard-axis direction. Easy-axis plot 70 is shifted such that, under no externally applied field, ferromagnetic layer 60 always exhibits magnetization in the same direction. This represents a "soft" pinning or stabilization of the moments in ferromagnetic layer 60. This pinning aligns substantially all of the magnetic domains in ferromagnetic layer 60, greatly reducing Barkhausen noise. Virtually no increase in hysteresis in hard-axis plot 72 can be seen. This hysteresis can be expressed as a coercivity of less than 0.1 oersteds. Also, anisotropy field value $H_k$ has increased to 13 oersteds. The pinning strength can be varied by changing the configuration, materials, and layer thicknesses.

Figure 6:
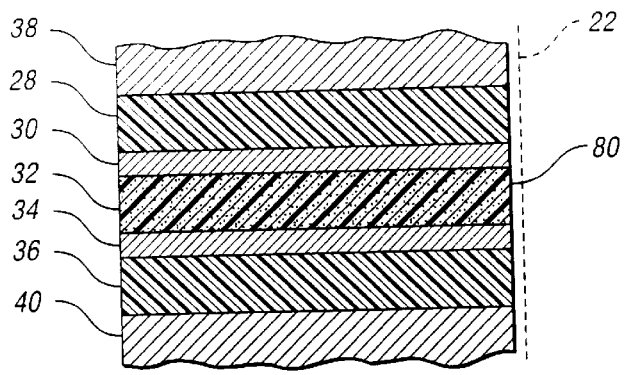
FIG. 6 is a schematic diagram of an embodiment of the present invention wherein the second insulator layer is a biasing layer.
Figure 7:
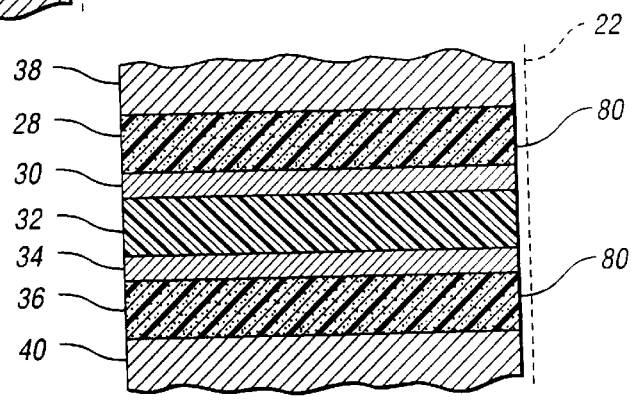
FIG. 7 is a schematic diagram of an embodiment of the present invention wherein the first insulator layer and the third insulator layer are biasing layers.
Figure 8:
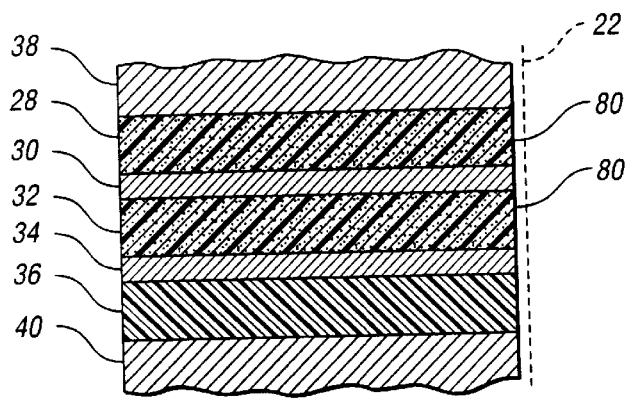
FIG. 8 is a schematic diagram of an embodiment of the present invention wherein the first insulator layer and the second insulator layer are biasing layers.
Figure 9:
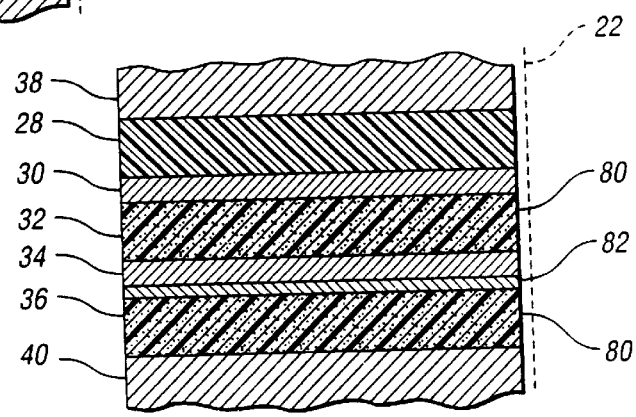
FIG. 9 is a schematic diagram of an embodiment of the present invention wherein the second insulator layer and the third insulator layer are biasing layers.

Referring to FIGS. 6 through 9, schematic diagrams of embodiments of the present invention wherein at least one insulator layer is an electrically nonconductive antiferromagnetic biasing layer are shown. Insulator layer 28,32,36 which is also a biasing layer, indicated by 80, provides biasing of one or more MR layers 30,34 in addition to insulation and magnetic gap spacing. In FIG. 6, second insulator layer 32 serves as biasing layer 80. In FIG. 7, first insulator layer 28 and third insulator layer 36 serve as biasing layers 80. In FIG. 8, first insulator layer 28 and second insulator layer 32 serve as biasing layers 80. In FIG. 9, second insulating layer 32 and third insulating layer 36 serve as biasing layers 80. It should be noted that, in the absence of any features to the contrary, sensing element 26 is symmetric in tape direction 24 about second insulator layer 32. In this case, the embodiments shown in FIGS. 8 and 9 are essentially identical.

Active MR layers 30,34 are comprised of a ferromagnetic material such as Permalloy. Various cobalt nickel monoxides ($Co_xNi_yO$) may also be used. Shield layers 38,40 may be comprised of ferrite or a metal such as nickel iron (NiFe) or cobalt zirconium tantalum (CZT). Insulator layers 28,32,36 not used as biasing layer 80 may be constructed of an electrically insulating material such as silicon nitride, silicon dioxide, or, preferably, aluminum oxide. Biasing insulator layer 80 is comprised of an electrically nonconductive antiferromagnetic material such as, preferably, nickel oxide (NiO).

Sensing element 26 is constructed by depositing alternating layers of insulating and magnetoresistive materials. The formation of non-biasing insulator layers 28,32,36 and active MR layers 30,34 are well known in the art. However, the deposition of insulator layer 28,32,36 which is also biasing layer 80 requires additional processing considerations.

The first processing consideration is that the interface between biasing layer 80 and adjacent active MR layer 30,34 must be free of contaminants. This may be accomplished by depositing biasing layer 80 and active MR layer 30,34 within the same clean environment. Alternately, the surface of one layer may be cleaned by a process such as sputter etching prior to the deposition of the next layer.

The second process consideration is that biasing layer 80 should be deposited in the presence of a magnetic field aligned in the direction in which biasing layer 80 will be biasing adjacent active MR layer 30,34.

Sensing element 26 may be tuned by changing the thicknesses of active MR layers 30,34 and biasing layers 80. In general, increasing the thickness of biasing layer 80 and decreasing the thickness of adjacent active MR layer 30,34 increases the strength of which domain regions in active MR layers 30,34 are pinned by adjacent biasing layer 80.

In designs having two biasing layers 80 adjacent to an active MR layer 30,34, such as shown in FIGS. 8 and 9, it may be desirable to insert separation layer 82 between one biasing layer 80 and the active MR layer 30,34. Separation layer 82 breaks the exchange bias from the biasing layer 80 adjacent to separation layer 82 and gives greater control over the strength at which MR layer 30,34 is pinned. Separation layer 82 may be constructed of an insulator material or of a highly resistive metal. In a preferred embodiment, a film including at least one of titanium or tantalum is used as separation layer 82. FIG. 9 shows the inclusion of separation layer 82.

Referring now to FIGS. 10 through 13, schematic diagrams of embodiments of magnetoresistive sensors having various magnetization directions for MR layers are shown. Each active MR layer 30,34 is adjacent to at least one biasing layer 80. The thickness of each active magnetoresistive layer 30,34 allows the adjacent biasing layer 80 to establish a weak field across the thickness of the adjacent active MR layer 30,34. The established weak field generally produces magnetization having the same direction throughout active MR layer 30,34 in the absence of an externally applied field. Shield layers 38,40 have been omitted from FIGS. 10 through 13 for clarity.

Figure 10:
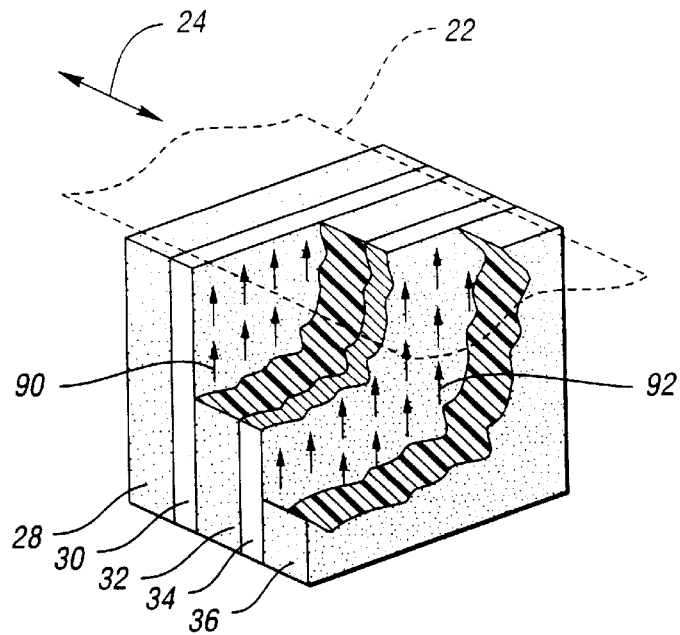
FIG. 10 is a schematic diagram of an embodiment of the present invention having a magnetoresistive sensor with parallel magnetization directions for MR layers.
Figure 11:
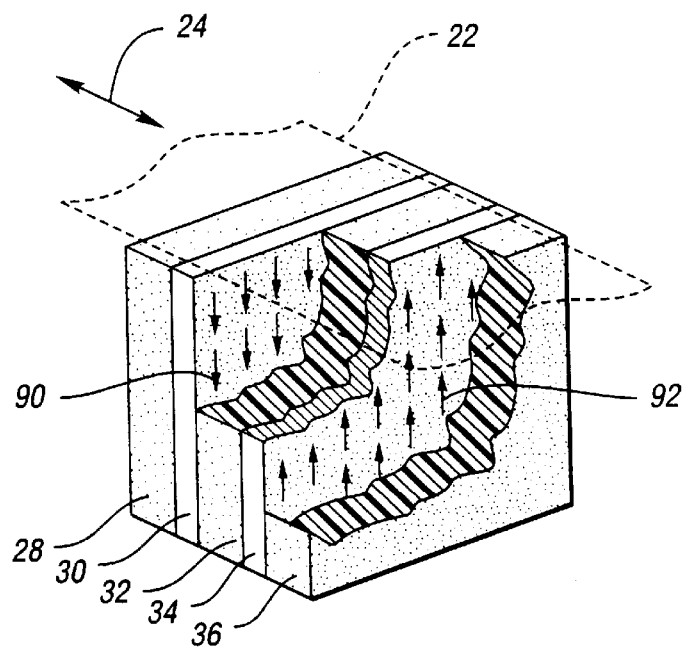
FIG. 11 is a schematic diagram of an embodiment of the present invention having a magnetoresistive sensor with antiparallel magnetization directions for MR layers.

In FIG. 10, induced magnetization direction 90 in first active MR layer 30 is parallel to induced magnetization direction 92 in second active MR layer 34. In FIG. 11, first active MR layer magnetization direction 90 is antiparallel with second active MR layer magnetization direction 92.

Figure 12:
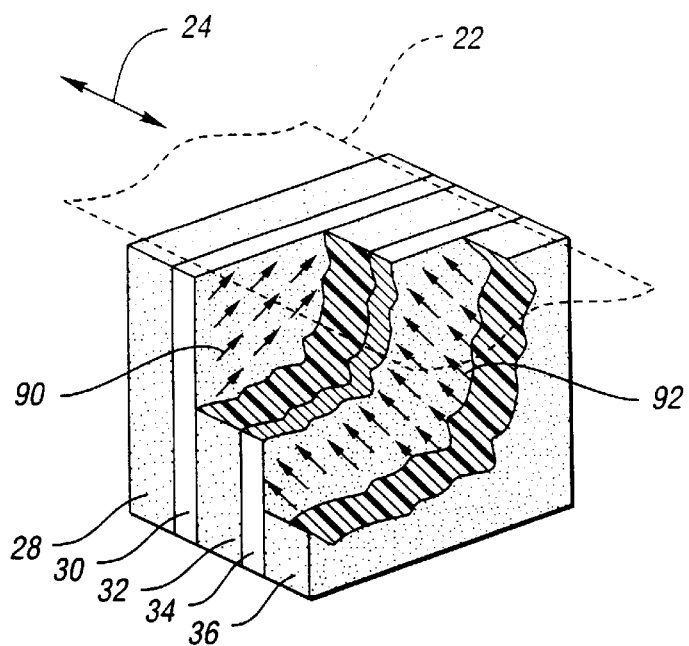
FIG. 12 is a schematic diagram of an embodiment of the present invention having a magnetoresistive sensor with normal magnetization directions for MR layers.
Figure 13:
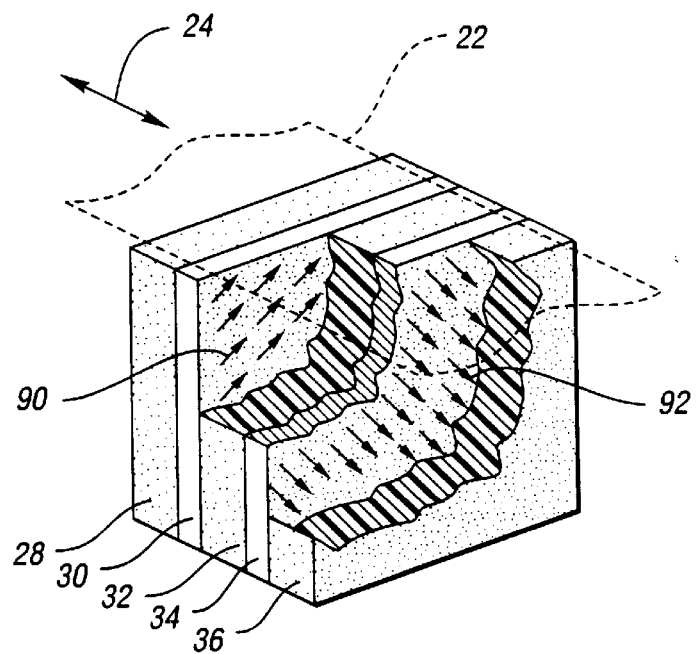
FIG. 13 is a schematic diagram of an alternative embodiment of the present invention having a magnetoresistive sensor with normal magnetization directions for MR layers.

In FIGS. 12 and 13, first active MR layer magnetization direction 90 is normal to second active MR layer magnetization direction 92. In FIG. 12, magnetization directions 90,92 are at ±45° with a normal to the surface of tape 22. In FIG. 13, magnetization directions 90,92 are at 45° and 135° with a normal to the surface of tape 22.

For any embodiment shown in FIGS. 10 through 13, an equivalent embodiment may be obtained by reversing the directions of both induced magnetization directions 90,92.

Design parameters including insulator thickness, materials, magnetization directions, and biasing current magnitude may be varied to alter performance characteristics such as pinning strength and sensitivity to externally applied fields. Model-based solutions are used to assist in obtaining design parameter values for specific design constraints and desired levels of performance.

While the best modes for carrying out the invention have been described in detail, other possibilities exist within the spirit and scope of the present invention. Those familiar with the art to which this invention relates will recognize various alternative designs and embodiments for practicing the invention as defined by the following claims.

What is claimed is:

1. A dual active element magnetoresistive read head for magnetic tape comprising:
   a first insulator layer;
   a first active magnetoresistive layer on the first insulator layer;
   a second insulator layer on the first active magnetoresistive layer;
   a second active magnetoresistive layer on the second insulator layer, the second active magnetoresistive layer magnetostatically coupled to the first active magnetoresistive layer; and
   a third insulator layer on the second active magnetoresistive layer;
   wherein at least two insulator layers on either side of a particular magnetoresistive layer are biasing layers comprised of an electrically nonconductive antiferromagnetic material, the read head further comprising a separation layer between one of the two biasing insulator layers and the particular magnetoresistive layer, the separation layer breaking the exchange bias from one of the insulator layers to the particular magnetoresistive layer.

2. A dual active element magnetoresistive read head as in claim 1 wherein the electrically nonconductive antiferromagnetic material is nickel oxide (NiO).

3. A dual active element magnetoresistive read head as in claim 1 wherein at least one of the biasing layers is the second insulator layers.

4. A dual active element magnetoresistive read head as in claim 1 wherein the biasing layers comprise the first insulator layer and the third insulator layer.

5. A dual active element magnetoresistive read head as in claim 1 wherein the biasing layers comprise the second insulator layer and the third insulator layer.

6. A dual active element magnetoresistive read head as in claim 1 wherein the biasing layers comprise the first insulator layer and the second insulator layer.

7. A dual active element magnetoresistive read head as in claim 1 wherein each active magnetoresistive layer has a thickness allowing an adjacent biasing layer to establish a weak field across the thickness of the active magnetoresistive layer, the weak field producing magnetization substantially in the same direction throughout the active magnetoresistive layer in the absence of an externally applied field.

8. A dual active element magnetoresistive read head as in claim 7 wherein the weak field established in the first magnetoresistive layer is parallel to the weak field established in the second magnetoresistive layer.

9. A dual active element magnetoresistive read head as in claim 7 wherein the weak field established in the first magnetoresistive layer is antiparallel to the weak field established in the second magnetoresistive layer.

10. A dual active element magnetoresistive read head as in claim 7 wherein the weak field established in the first magnetoresistive layer is normal to the weak field established in the second magnetoresistive layer.

11. A dual active element magnetoresistive read head as in claim 1 wherein the separation layer comprises at least one from a set including titanium and tantalum.

12. A dual active element magnetoresistive read head as in claim 1 further comprising:
    a first shield layer adjacent to the first insulator layer and opposite from the first magnetoresistive layer; and
    a second shield layer adjacent to the third insulator layer and opposite from the second magnetoresistive layer.

13. A magnetoresistive read head assembly for sensing information recorded on a magnetic tape surface comprising:
    a first insulator layer normal to the tape surface and normal to a direction of tape travel past the first insulator layer;
    a first active magnetoresistive layer on the first insulator layer;
    a second insulator layer on the first active magnetoresistive layer;
    a second active magnetoresistive layer on the second insulator layer, the second active magnetoresistive layer magnetostatically coupled to the first active magnetoresistive layer;
    a third insulator layer on the second active magnetoresistive layer;
    means for supplying current through the first active magnetoresistive layer and the second active magnetoresistive layer; and
    means for detecting the relative change in resistance between the first active magnetoresistive layer and the second active magnetoresistive layer due to changing magnetic fields produced by the moving magnetic tape;
    wherein at least two insulator layers on either side of a particular magnetoresistive layer are comprised of an electrically nonconductive antiferromagnetic material, the read head further comprising a separation layer between one of the two layers comprised of an electrically nonconductive antiferromagnetic material and the particular magnetoresistive layer, the separation layer breaking the exchange bias from one of the insulating layers comprised of an electrically nonconductive antiferromagnetic material to the particular magnetoresistive layer.

14. A magnetoresistive read head assembly as in claim 13 wherein the electrically nonconductive antiferromagnetic material is nickel oxide (NiO).

15. A magnetoresistive read head assembly as in claim 13 wherein one insulator layer comprised of an electrically nonconductive antiferromagnetic material is the second insulator layer.

16. A magnetoresistive read head assembly as in claim 13 wherein the at least two insulator layers comprised of an electrically nonconductive antiferromagnetic material is the first insulator layer and the third insulator layer.

17. A magnetoresistive read head assembly as in claim 13 wherein at least two insulator layers comprised of an electrically nonconductive antiferromagnetic material is the second insulator layer and the third insulator layer.

18. A magnetoresistive read head assembly as in claim 13 wherein the at least two insulator layers comprised of an electrically nonconductive antiferromagnetic material is the first insulator layer and the second insulator layer.

19. A magnetoresistive read head assembly as in claim 13 wherein each active magnetoresistive layer has a thickness allowing at least one electrically nonconductive antiferromagnetic layer to establish a weak field across the thickness of the active magnetoresistive layer, the weak field producing magnetization substantially in the same direction throughout the active magnetoresistive layer in the absence of an externally applied field.

20. A magnetoresistive read head assembly as in claim 19 wherein the weak field established in the first magnetoresistive layer is parallel to the weak field established in the second magnetoresistive layer.

21. A magnetoresistive read head assembly as in claim 19 wherein the weak field established in the first magnetoresistive layer is antiparallel to the weak field established in the second magnetoresistive layer.

22. A magnetoresistive read head assembly as in claim 19 wherein the weak field established in the first magnetoresistive layer is normal to the weak field established in the second magnetoresistive layer.

23. A magnetoresistive read head assembly as in claim 13 wherein the separation layer comprises at least one from a set including titanium and tantalum.

24. A magnetoresistive read head assembly as in claim 13 further comprising:

a first shield layer adjacent to the first insulator layer and opposite from the first magnetoresistive layer; and a second shield layer adjacent to the third insulator layer and opposite from the second magnetoresistive layer.

* * * * *